United States Patent Office 3,206,436
Patented Sept. 14, 1965

3,206,436
PREPARATION OF POLYESTERS FROM
DITHIOLESTERS
Ardy Armen and Charles R. Pfeifer, Newport News, Va.,
assignors to The Dow Chemical Company, Midland,
Mich., a corporation of Delaware
No Drawing. Filed Jan. 3, 1961, Ser. No. 79,985
10 Claims. (Cl. 260—75)

The present invention contributes to the polymer art and relates, in particular, to a new and improved process for the preparation of polyesters from dithiolesters.

Difficulty has been frequently encountered when attempts are made to convert diols and dicarboxylic acids into polyesters having a molecular weight of an order of magnitude sufficiently high to permit their advantageous utilization for the preparation of good quality synthetic textile fibers, films and the like shaped articles. Attempts to overcome the difficulty by the use of certain derivatives of the diacid (e.g., a diester in the preparation of polyethylene terephthalate) are generally inadequate and dissatisfactory for the purpose.

Frequently, for example, the known methods of polyester preparation produce only undesirably low molecular weight and dissatisfactorily colored products. Such substandard and colored products are naturally unsuitable for applications wherein high molecular weight materials are required. This is the case when the polyester products are intended for use in films, fibers, and the like shaped articles.

To illustrate the heretofore known general procedures for preparation of polyesters, the following equations are set forth as representative techniques:

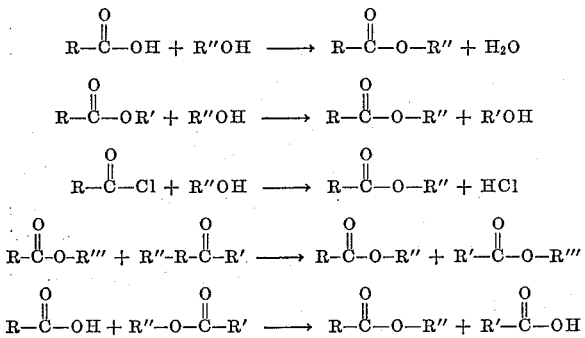

It would be an advantage to provide a new and better way for preparation from diols and dicarboxylic acids of eminently satisfactory, high molecular weight polyester products that would be particularly well suited for use in the manufacture of premium quality fibers, films and the like shaped articles.

It is, consequently, the principal object of the invention to provide a unique and highly advantageous, two-stage process for the preparation of polyesters in a reaction involving di-(alkylthiol esters) with the aliphatic diols.

Another object of the invention is to provide useful linear polyester products of a much improved character. A further object of the invention is to provide a new process for the preparation of polyester products that are particularly well adapted for employment in the manufacture of thermoplastic filaments capable of being spun into textile fibers having many beneficial properties appropriately tailored to a variety of applications.

An additional object of the invention is the provision of a successful process for the preparation of polyester products that are beneficial for the fabrication of clear, colorless, pliable thermoplastic films.

These desiderations and cognate benefits and advantages are provided by means of the improved two-stage process of the invention for preparation of polyester products which comprises reacting di-(alkylthiol esters), wherein the alkyl group may contain from one to four carbon atoms, with an unbranched aliphatic diol of the general formula:

wherein $n$ is an integer of from 2 to 20 inclusively, in the presence of a polymerization catalyst.

The reaction involved in practice of the present invention may be generally represented by the equation:

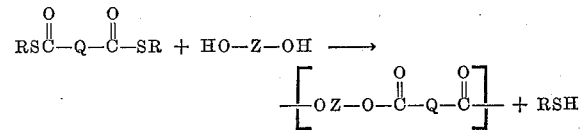

wherein Q is any organic moiety (it being more particularly advantageous for this substituent to be an organic moiety containing at least one aromatic nucleus and still more beneficial for the atoms therein which are joined directly to the thiolester group to be carbon atoms); R is any alkyl group that includes up to four carbon atoms, and Z is any alkylene or divalent aliphatic radical containing from 2 to about 20 carbon atoms.

The unique procedure for polyester preparation involved in present practice possibilitates an efficient yield of high molecular weight product in all instances.

Among the outstanding beneficial advantages to be gained by practice of the invention is the smooth and efficient way in which the reaction proceeds. A notably short period of time is involved in bringing the reaction to completion in the practice of the present invention as compared to that involved when following the heretofore known procedures. The new method assures the production of valuable, generally colorless, and usually high molecular weight polyester polymer products that are ideally suited for the preparation of synthetic textile fibers, plastic films, and the like shaped articles which are useful for many and varied purposes.

The huge array of useful polymers made possible by virtue of the present contribution to the art provides a striking contrast to the unsatisfactory materials (oftentimes of low molecular weight and deeply colored nature and also frequently actually physically sticky and undesirably cross-linked) which are usually obtained in attempts to prepare similar polymers by the heretofore known methods.

The di-(alkylthiol ester) reactants utilized in the present process are readily prepared by heating the salts of thiocarboxylic acids with alkyl halides. Typical of suitable di-(alkylthiol esters) are the dimethyl-, diethyl-, dipropyl-, and dibutylthiol esters of bi-p-toluic acid; dimethyl-, diethyl-, dipropyl-, and dibutylthiol esters of 4,4'-diphenic acid and the like.

The aliphatic unbranched diols applicable in the improved process of the invention can be alkylene glycols, such as ethylene-, propylene-, and butylene glycols; the aliphatic diols such as 1,3-propanediol, 1,14-butanediol, 1,5-pentanediol, 1,6-hexanediol, 1,7-heptanediol, 1,8-octanediol, 1,9-nonanediol, 1,10-decanediol, and the like.

The catalysts operable in practice of the invention are any of the catalysts known in the art which may be employed to promote polycondensation reactions of diesters with diols. Catalysts that are particularly useful for present purposes include zinc borate, tetrabutyl titanate, lead oxide, and so forth.

In the practice of the invention, the principal reactants are combined in a suitable polymerization vessel that is capable of being evacuated. The reactor is generally equipped with a thermometer, gas inlet and outlet tubes, and an appropriate means of heating. External heating is oftentimes quite suitable for the purpose. Glass or glass-lined units or other inert materials may be employed in or for the reactor which, if desired, may beneficially have a tubular configuration.

The reactants are generally best mixed in such relative proportions as will ensure an approximately two- to three-fold molar excess of the aliphatic diol in relation to the quantity of the di-(alkylthiol ester) that is present, provided the diol is sufficiently volatile to permit its complete removal. Aliphatic diols containing a maximum of six carbon atoms in the carbon chain are generally sufficiently volatile to be used in such an excess proportion. When less volatile diols are utilized, it is better to employ lower molar ratios of the diols to the dithiolesters being reacted.

The eminently satisfactory method of the instant invention proceeds smoothly and rapidly through a two stage reaction process. The first stage involves the transesterification of a di-alkylthiol ester) with an aliphatic diol to form an alkylhydroxy-alkylthiol diester as the intermediate product. The intermediate diester immediately progresses to a second stage reaction which is induced by increasing the temperature and decreasing the pressure of the reaction mixture to affect polymerization of the reactants to high molecular weight materials.

In the first stage of the reaction, the combined ingredients are heated to a temperature above the boiling point of the mercaptan by-product that is formed, but below that of the diol under the pressure prevailing in the reaction under atmospheric pressure, although moderate vacuum (i.e. as low as 1 mm. mercury absolute pressure) to low positive pressures (i.e. up to two atmospheres or so) may also be employed.

During the second stage reaction, the temperature and pressure are selected so as to exceed the boiling point of the diol used. Vacuum may advantageously be employed to hasten the removal of the diol at a given temperature. The temperature of the reaction mixture is generally held below about 350° C. to avoid decomposition of the product.

Additional equipment to control or achieve various reaction conditions may be desirable. Conditions to be considered in this regard include mixing of the reactants; removable of by-products formed by the reactants; and control of the atmospheric medium in direct contact with the reaction mixture.

The reactants may be mixed by any of a number of known methods. These may involve either mechanical or non-mechanical techniques, such as rotating, shaking, stirring tumbling, or by pressuring an inert gas through the reaction mixture. The reaction by-products, if volatile, may be removed by normal, uncontrolled vaporization, distillation, or by controlled venting or vaporization. The atmospheric medium in direct contact with the reaction mixture may be vapor of volatile by-products or an inert gas atmosphere, such as nitrogen, helium, argon, etc.

It is oftentimes most advantageous, efficient, and effective to provide means for mixing, by-product removal, and a suitable atmospheric condition, by the controlled use of one substance. This beneficially is an inert gas, such as nitrogen, which is passed through the reaction mass so as to simultaneously effect the indicated operation.

Thus, a stream of nitrogen or an equivalent inert gas under pressure is bubbled through the reaction mixture at a rapid enough rate to cause adequate agitation of the reactants. The inert gas, as indicated, also provides the reaction mixture with an air-free atmospheric medium. And of additional benefit, the spent nitrogen or other inert gas acts as a carrier vehicle whereby the by-product mercaptan is vented and thus, advantageously and desirably, removed from the reaction system.

The reaction time of the first stage of the process is governed by the amount of time required to remove a substantial proportion of the mercaptan from the thiolester groups. This period of time may be varied from as little as about 15 minutes to as long as about eight hours. Care should be taken to heat for an adequate period of time in order to obtain a complete transesterification of the thiol ester group during the heating period. Insufficient heating of the reaction mixture can be responsible for lowering of the molecular weight of the intermediate diester product. On the other hand, unduly prolonged heat application should be avoided, since longer periods of heating of the reaction mixture tend to encourage undesirable side reactions.

The second stage reaction heating schedule, important for attaining a good fiber-forming polymeric product, may be run over a period as short as about 15 minutes to one that is as extended as several hours. Low molecular weight material, which is not well suited to the formation of filamentary products, tends to result from incomplete polymerization reactions. These can stem from unguarded, poorly-controlled heating schedules. Longer heating cycles ordinarily force the reactants to produce a polymeric material of undesirably high viscosity. The high viscosity material is likewise not advantageous for fiber-forming purposes since it may create difficulties in fabrication.

The type of reaction product formed in the first stage process of the instant invention depends on the amount of diol employed.

For example, the product formed as a result of the first stage reaction when an excess of the diol is employed is a di-omega-hydroxy diester represented by the general formula:

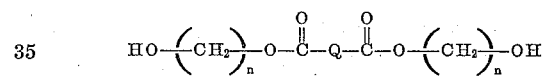

In contrast, the product resulting from the first stage reaction when substantially equal molar portions of reactants are used is an alkylhydroxy-alkylthioldiester represented by the general formula:

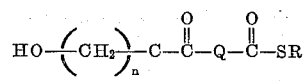

The polyester product resulting from the second stage reaction is obtained in quantitative yields, as based on the quantity of dithiolester employed.

The polyester product of the invention is of the general formula:

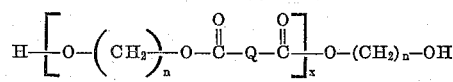

wherein Q and R are as above defined; $n$ is an integer from 2 to about 20; and $x$ is a plural integer of from about 2 to about 250, advantageously from 150 to 200.

In large-scale production, additional merit in practice of the present invention lies in the fact that no special recovery procedures (such as washing, recrystallization, or other purification steps) are required to prepare the polyesters for conversion to valuable films, fibers and the like end products. The polyester products can be spun into filamentary products and extruded as films directly from the molten reaction product. This, as a matter of great significance, allows direct polymerization-to-spinning or -extrusion techniques to be followed without requirement of intermediate steps, including remelting, between polymerization and fabrication.

The following examples are given to further illustrate the invention, wherein all parts and percentages are by weight unless otherwise indicated. Of course, the specific ingredients used in the following are exemplary only and may be replaced in whole or in part by other of the similar and equivalent ingredients.

EXAMPLE I

About 20 grams of a purified dimethylthiol diester of bi-p-toluic acid, about 20 grams of ethylene glycol and about 0.25 gram of zinc borate were combined in a glass polymerization tube capable of being evacuated and provided with a thermometer, gas inlet and outlet attachments, and an external heating source. The dimethylthiol diester of bi-p-toluic acid had a melting point of 140° C. and the structural formula:

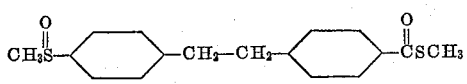

The mixture of reactants was heated to a temperature of about 250° C. under vacuum for a period of about 6 hours. Nitrogen was then admitted slowly into the reaction tube, providing an agitating motion to the mixture. The inert gas also acted as a vehicle to facilitate the continuous venting or evolution of the principal by-product of the reaction, namely methyl mercaptan. Methyl mercaptan was released in admixture with the nitrogen gas.

As the reaction proceeded, the amount of methyl mercaptan evolved in the nitrogen gas decreased progressively. When unreacted ethylene glycol started to vent with the nitrogen from the reaction mixture, the temperature was immediately raised to about 290° C. and the pressure was reduced to about 2 mm. Hg. The reaction was continued for approximately 2 hours under the specified conditions.

The reaction product was colorless, viscous poly(dimethylene 4,4'-bi-p-toluate). The polymer was soluble in m-cresol, showing a reduced viscosity therein of about 0.431 at a temperature of 35° C.

Further purification of the polyester, such as washing with water or recrystallizing from a solvent, was not required prior to fabrication. Rather, the resulting viscous molten polymer was melt spun into a filament through a suitable spinnerette. The extruded filament was then stretched to six times its originally extruded length in steam to produce a three denier, crystalline, fiber product which had the following properties:

| | | |
|---|---|---|
| Melting point | °C | 215 |
| Initial modulus | g./den. | 160 |
| Yield point | g./den. | 3.5 |
| Tenacity | g./den. | .5 |
| Extensibility | percent | 50 |

EXAMPLE II

Employing similar procedures and equipment to those described in Example I, about 6 grams of the dimethylthiol diester of 4,4'-diphenic acid; about 6 grams of 1,4-butanediol; and about 0.40 gram of a solution of about 0.2 gram of sodium and about 10 milliliters of tetrabutyl titanate dissolved in approximately 90 milliliters of ethanol were admixed and heated at a temperature of about 250° C. at substantially atmospheric pressure. The mercaptan by-product ceased to evolve from the reaction mixture after 2 hours at a reaction temperature of about 250° C. This was the point of completion of the first stage transesterification reaction.

At this point, vacuum was applied and the temperature of the reaction was then raised to about 275° C. After about 15 minutes of heating at about 275° C., the reaction mixture become solid. Thereafter, the temperature of the reactants was again elevated and maintained at about 300° C. for approximately 1 hour.

The product obtained was a hot, viscous, colorless polymer which, without requiring additional purification, was melt spun into an amorphous filament at about 330° C. The filamentary product was annealed at about 110° C. for about 4 hours to give a highly crystalline material which melted at 283° C.

EXAMPLE III

Employing the procedure of Example II, poly(decamethylene-4,4'-diphenate) was prepared from the dimethylthiol diester of 4,4'-diphenic acid and 1,10-decanediol. The polymer had a reduced viscosity of about 0.562 in m-cresol at 35° C. The polymeric product was melt spun into an amorphous fiber from the melt maintained at a temperature of about 200° C. After the heat annealing process, the fibers were highly crystalline and melted at a temperature of about 178° C.

The many outstanding, superior, and beneficial properties of the polyester materials prepared by means of the improved process of this invention can be more conclusively illustrated as compared with the reaction products obtained from the four runs which follow. In these runs, attempts were made to react diacids and derivatives of diacids with diols to form the desired polyester materials. The reactions were obviously unsuccessful.

Run I

About 1 part of chemically pure dimethyl bi-p-toluate (M.P. 121.5° C.) was mixed with about 2 parts of freshly distilled ethylene glycol in a vacuum-tight glass reaction vessel equipped with a thermometer, gas inlet and outlet tubes, and an external heating device. Approximately 0.005 part of zinc borate was added as the catalyst. The reaction mixture was then heated to a temperature of about 250° C. in an atmosphere of nitrogen while nitrogen gas under pressure was bubbled through the reaction mixture to agitate the same. The reaction was allowed to progress for approximately 5.5 hours under absolute pressure while the volatile methanol by-product continued to vent with the spent nitrogen gas.

When the evolution of methanol and excess ethylene glycol had ceased, the reaction temperature was steadily increased to about 290° C. while vacuum was applied to the system until the absolute pressure reached about 0.2 mm. Hg. During this period, the reactants were closely observed for signs of increasing viscosity. However, the color of the reaction mixture darkened in color before a suitable increase in viscosity was obtained.

In an attempt to complete the polymerization process, the temperature of the mixture was maintained at about 290° C. for nearly 2.5 hours. The resulting product was a dark, opaque mass which, when cooled under nitrogen gas, formed a black, brittle substance, and was entirely unsuited as a polymer from which fibers could be drawn.

Run II

Employing the procedure set forth in Run I, the following compounds were mixed in parts by weight closely approximating those indicated immediately below and were reacted.

| | Parts |
|---|---|
| Dimethyl bi-p-toluate | 1 |
| Ethylene glycol | 2 |
| Zinc borate | 0.015 |

A product, resembling the black, brittle substance obtained in Run I resulted.

Run III

Employing the procedure set forth in Run I, the following ingredients were reacted in parts by weight closely approximating those indicated immediately below:

| | Parts |
|---|---|
| Bi-p-toluic acid | 1 |
| Ethylene glycol | 2 |
| Zinc borate | 0.015 |

There was no evidence of a polymerization reaction occurring at temperatures up to about 30° C.

Run IV

The procedure set forth in Run I was repeated in an attempt to prepare poly(tetramethylene-4,4'-diphenate)

from the following compounds having weights closely approximating the weights indicated directly below:

| | Grams |
|---|---|
| Diisobutyl-4,4'-diphenate | 6 |
| 1,4-butanediol | 6 |
| Tetrabutyl titanate | 0.005 |

The product was slightly discolored, could not be spun into a filament, and was insoluble in m-cresol.

What is claimed is:

1. A two stage process for the preparation of polyesters which comprises (1) mixing (A) about 1 mole of a di-(alkylthiol ester) represented by the general formula:

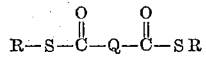

wherein Q is a bridging group selected from the group consisting of a divalent hydrocarbon radical consisting of 4,4'-diphenylene and a divalent hydrocarbon radical consisting of two para-phenylene groups separated by two methylene groups and R is an alkyl group containing from 1 to 4 carbon atoms; with (B) from about 1 to about 4 moles of an unbranched aliphatic diol represented by the general formula:

wherein $n$ is an integer of from 2 to 20 inclusively and a catalytic quantity of a transesterification catalyst; heating the mixture under substantially atmospheric pressure to a temperature above the boiling point of the mercaptan by-product formed during the first stage reaction but below the boiling point of said unbranched aliphatic diol and maintaining the mixture at the mercaptan distillation temperature until a substantial proportion of the mercaptan by-product is removed; (2) then elevating the temperature of said mixture under subatmospheric pressure during the second stage reaction and maintaining the mixture at the diol distillation temperature until substantially all of the unreacted diol is removed; to form a clear, substantially colorless, viscous polyester.

2. The process of claim 1, wherein said di-(alkylthiol ester) employed is the dimethylthiol diester of bi-p-toluic acid.

3. The process of claim 1, wherein said di-(alkylthiol ester) employed is the dimethylthiol diester of 4,4'-diphenic acid.

4. The process of claim 1, wherein said aliphatic diol employed is 1,4-butanediol.

5. The process of claim 1, wherein said aliphatic diol employed is ethylene glycol.

6. The process of claim 1, wherein said aliphatic diol employed is 1,10-decanediol.

7. The process of claim 1, wherein the temperature employed in the first stage reaction ranges from about 100° C. to about 230° C. under substantially atmospheric pressures.

8. The process of claim 1, wherein the temperature employed in the second stage reaction ranges from about 230° C. and not in excess of about 350° C. under subatmospheric pressures.

9. The process of claim 1, wherein the time of first stage reaction ranges from about 15 minutes and about 8 hours.

10. The process of claim 1, wherein the time of second stage reaction ranges from about 15 minutes and about 3 hours.

References Cited by the Examiner

UNITED STATES PATENTS

| 2,437,232 | 3/48 | Rothrock | 260—75 |
| 2,465,319 | 3/49 | Whinfield et al. | 260—75 |
| 2,727,881 | 12/49 | Caldwell et al. | 260—75 |
| 2,826,600 | 3/58 | Driver | 260—455 |

OTHER REFERENCES

Marvel et al.: Polythiolesters article, J.A.C.S., March 1951, vol. 73, pages 1100–1102.

Sasin et al.: Ester Interchange Reactions of Long Chain Thiol Esters, in Journal of Organic Chemistry 22, p. 1183–4, October 1957.

WILLIAM H. SHORT, *Primary Examiner.*

PHILIP E. MANGAN, LOUISE P. QUAST, *Examiners.*

UNITED STATES PATENT OFFICE
CERTIFICATE OF CORRECTION

Patent No. 3,206,436                  September 14, 1965

Ardy Armen et al.

It is hereby certified that error appears in the above numbered patent requiring correction and that the said Letters Patent should read as corrected below.

Column 1, lines 43 to 45, the formula should appear as shown below instead of as in the patent:

column 2, line 59, for "1,14-butanediol" read -- 1,4-butanediol --; column 3, line 44, for "removable" read -- removal --; line 50, after "stirring" insert a comma; column 5, lines 10 to 13, the left-hand portion of the formula should appear as shown below instead of as in the patent:

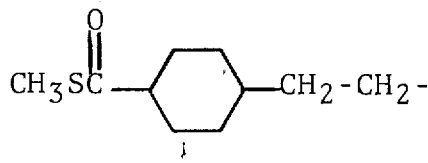

line 64, for "become" read -- became --; column 6, line 71, for "30° C." read -- 330° C. --.

Signed and sealed this 27th day of September 1966.

(SEAL)
Attest:

ERNEST W. SWIDER                  EDWARD J. BRENNER
Attesting Officer                Commissioner of Patents